United States Patent [19]

Tsutomu et al.

[11] Patent Number: 5,341,576
[45] Date of Patent: Aug. 30, 1994

[54] METHOD AND APPARATUS FOR DRYING GRANULAR MATERIALS

[75] Inventors: Ono Tsutomu; Nosaka Masaaki, both of Hirakata, Japan

[73] Assignee: Matsui Manufacturing Co., Ltd., Osaka, Japan

[21] Appl. No.: 720,193

[22] Filed: Jun. 25, 1991

[30] Foreign Application Priority Data

Jun. 29, 1990 [JP] Japan ................... 2-172948

[51] Int. Cl.$^5$ ............................................. F26B 3/34
[52] U.S. Cl. .................................. 34/263; 34/412; 34/92; 34/259
[58] Field of Search ............... 34/1 R, 1 P, 1 T, 1 U, 34/1 V, 17, 60, 68, 92, 15

[56] References Cited

U.S. PATENT DOCUMENTS

| | | | |
|---|---|---|---|
| 3,834,038 | 9/1974 | Janda | 34/1 T |
| 4,347,670 | 9/1982 | Wear et al. | 34/1 T |
| 4,549,053 | 10/1985 | Haugh | 34/1 T |
| 4,626,640 | 12/1986 | van der Heijden | 34/1 S |
| 4,714,812 | 12/1987 | Haagensen et al. | 34/1 U |
| 4,954,681 | 9/1990 | Ishikawa et al. | 34/1 P |
| 4,957,434 | 9/1990 | Radomsky | 34/1 P |

Primary Examiner—Denise Gromada
Attorney, Agent, or Firm—Koda and Androlia

[57] ABSTRACT

The present invention discloses a method and an apparatus for drying granular materials by submitting them to dielectric heating by means of electromagnetic waves such as microwave, high frequency, etc. The granular materials to be dried are heated to the prescribed temperature with electromagnetic waves under a reduced pressure of a range not producing any glow discharge and then dried to the prescribed moisture percentage while passing through a pressure reducing process of a vacuum of higher degree. An apparatus for it is provided with a reduced pressure drying tank (1) having an electromagnetic wave generator (2), a main drying tank (30) communicated with said reduced pressure drying tank (1), and suction air sources (20), (20') which are provided respectively in the reduced pressure drying tank (1) and the main drying tank (30).

5 Claims, 2 Drawing Sheets

METHOD AND APPARATUS FOR DRYING GRANULAR MATERIALS

BACKGROUND OF THE INVENTION

1. Field of the Invention

This invention relates to a method and an apparatus for drying powdered or granular materials such as synthetic resin materials, processed foot materials, chemical materials for medical use, etc. by submitting them to dielectric heating by means of electromagnetic waves such as microwave, high frequency, etc.

2. Prior Art

Conventionally, a drying method by hot air is widely known as drying method of this kind of powdered or granular materials. As concrete construction of that method, one which is indicated in FIG. 2 is known for example in addition to the so-called hopper dryer provided with a blower, a heater and a hopper.

The system indicated in FIG. 2 consists of a preliminary heating tank A comprising a stirring blade C which agitates the powdered or granular materials supplied through the material inlet B while heating them, a main drying tank F which receives the materials from the preliminary heating tank A through the material inlet G via a rotary feeder E connected to the material outlet D side of the preliminary heating tank A and heats them with the thermal energy of a heater H, a dehumidifying unit J which is provided on the upstream side of the said heater H and supplies dehumidified air, a piping T which returns the exhaust air of the main drying tank F through the exhaust port K to the heating port L of the preliminary heating tank A via a line filter N, a blower O and a heater $H_1$, and a piping R which returns the exhaust air of the preliminary heating tank A to the inlet Q of the regenerating line of the dehumidifying unit J through the exhaust port P.

Therefore, the powdered or granular materials submitted to preliminary heating in the preliminary heating tank A are dried in the main drying tank F and the powdered or granular materials thus dried to the prescribed moisture percentage are discharged from the material outlet S of the main drying tank F to the subsequent process. The preliminary heating tank A also serves as a crystallizing tank in the case of such powdered or granular materials as non crystallized polyethylene terephthalate, etc.

However, according to the conventional example mentioned above, the dehumidified air from the dehumidifying unit J is heated by the heaters H, $H_1$ respectively and the heated air is sent by the blower O to the preliminary heating tank A to heat the powdered or granular materials to the desired temperature (and to crystallize them in the case of such powdered or granular materials as non crystallized polyethylene terephthalate, etc.). After that, the heated air is sent to the main drying tank F to dry the powdered or granular materials to the prescribed moisture percentage. In this way, the heated air is made to pass through the tanks A, F as medium.

For that reason, in the conventional example, not only a large amount of electric power was consumed for the heating of air to raise the temperature of powdered or granular materials in the preliminary heating tank A, for the heating of air to regenerate the adsorbent in the dehumidifying unit J and for driving the blower O to send heated air but also the running cost was high because of a lower energy efficiency due to radiation loss in the sending route of heated air such as piping T, piping R, etc.

Moreover, the presence of the line filter N in the middle of the piping T also served to increase the system cost.

In addition, this conventional example was not suitable to such powdered or granular materials as turn yellow by oxidation when heated in the air as nylon.

The present invention is intended to solve all of the problems mentioned above by heating the powdered or granular materials to the prescribed temperature by means of electromagnetic waves such as microwave, etc. under a reduced pressure (and crystallizing them in the case of such powdered or granular materials as non crystallized polyethylene terephthalate, etc.) and, after that, drying them to the prescribed moisture percentage passing through a pressure reducing process.

SUMMARY OF THE INVENTION

One of the objects of the present invention is to provide a method and an apparatus for drying granular materials, namely a method for drying granular materials to be dried through a heating process which heats the granular materials to the prescribed temperature with electromagnetic waves under a reduced pressure lower than the atmospheric pressure of a range not producing any glow discharge and a pressure reducing process which performs final drying by producing a vacuum of a higher degree compared with the state of pressure reduction in said heating process in the absence of electromagnetic waves, and an apparatus for implementing that method provided with a reduced pressure drying tank having an electromagnetic wave generator which submits the granular materials fed through a material inlet, a main drying tank communicating with a material outlet of said reduced pressure drying tank through a communicating tube and a heater also being provided, and suction air sources connected respectively to said reduced pressure drying tank and the main drying tank. Since the invention of the present invention is provided with separate suction air sources for reduced pressure drying tank and the main drying tank, it can change as required the respected pressures to be applied to the two tanks. The radiation loss being comparatively small compared with the drying system by hot air because the apparatus is not designed for circulating air as medium by blowing through a piping as in the conventional drying system by hot air, thus providing a high energy efficiency.

Another object of the present invention is to provide (an apparatus capable of providing) a higher energy efficiency with a smaller radiation loss compared with the above by drying the powdered or granular materials under a reduced pressure in the pressure reducing process in addition to the heating process and also in the main drying tank in addition to the reduced pressure drying tank, the apparatus not being designed for circulating air as medium by blowing through a piping as in the conventional drying system by hot air.

The still another object of the present invention is to provide (an apparatus capable of) attenuating the yellowing of the powdered or granular materials compared with the conventional apparatus by submitting the powdered or granular materials to heating and drying by pressure reduction in the case of such powdered or granular materials as turn to yellow by oxidation when heated in the air as nylon.

A further object of the present invention is to provide (an apparatus capable of) further shortening the drying time by performing drying in a reduced pressure atmosphere in the case of powdered or granular materials as nylon as mentioned before and by setting the heating and the preservation temperature at a higher level compared with the conventional example.

A still further object of the present invention is to facilitate maintenance control and enable miniaturization of drying system with a smaller number of component parts because there is no need of making regeneration of line filter and dehumidifying unit as in the conventional example shown in FIG. 2 thanks to the above-mentioned construction.

An additional object of the present invention is to make it possible to accelerate the drying speed or improve the final moisture percentage by providing separate suction air sources for the reduced pressure drying tank and the main drying tank and producing different states of pressure reduction for the reduced pressure drying tank and the main drying tank as mentioned earlier.

Other objects, features and benefits of the present invention will become clearer with the following explanation:

To achieve the above objects, the present invention adopts a method for drying granular materials to be dried through a heating process which heats the granular materials with electromagnetic waves under a reduced pressure lower than the atmospheric pressure and a pressure reducing process which performs final drying by producing a vacuum of a higher degree compared with the state of pressure reduction in the heating process in the absence of electromagnetic waves.

As concrete construction for implementing the above method, the drying system is provided with a reduced pressure drying tank having an electromagnetic wave generator which submits the granular materials fed through the material inlet, a main drying tank communicated with the material outlet of the reduced pressure drying tank through a communicating tube and a heater also being provided, and suction air sources connected respectively to the reduced pressure drying tank and the main drying tank.

It is also possible to provide a preliminary reduced pressure tank on the upstream side of the reduced pressure drying tank so that the preliminary reduced pressure drying tank may also be depressurized by the suction air source. At least the suction air source of the reduced pressure drying tank may be used commonly to the preliminary reduced pressure drying tank.

The powdered or granular materials to be dried are heated to the prescribed temperature with electromagnetic waves such as microwave, etc. under a reduced pressure in either the heating process or the reduced pressure drying tank.

After that, the heated powdered or granular materials are dried to the prescribed moisture percentage while being heat insulated in either the drying tank, it is possible to prevent yellowing of powdered or granular materials due to oxidation and prevent staining of powdered or granular materials by external air because no blowing of hot air is used as medium as in the hot air drying system of the conventional example.

DETAILED DESCRIPTION OF THE INVENTION

Figure 1:
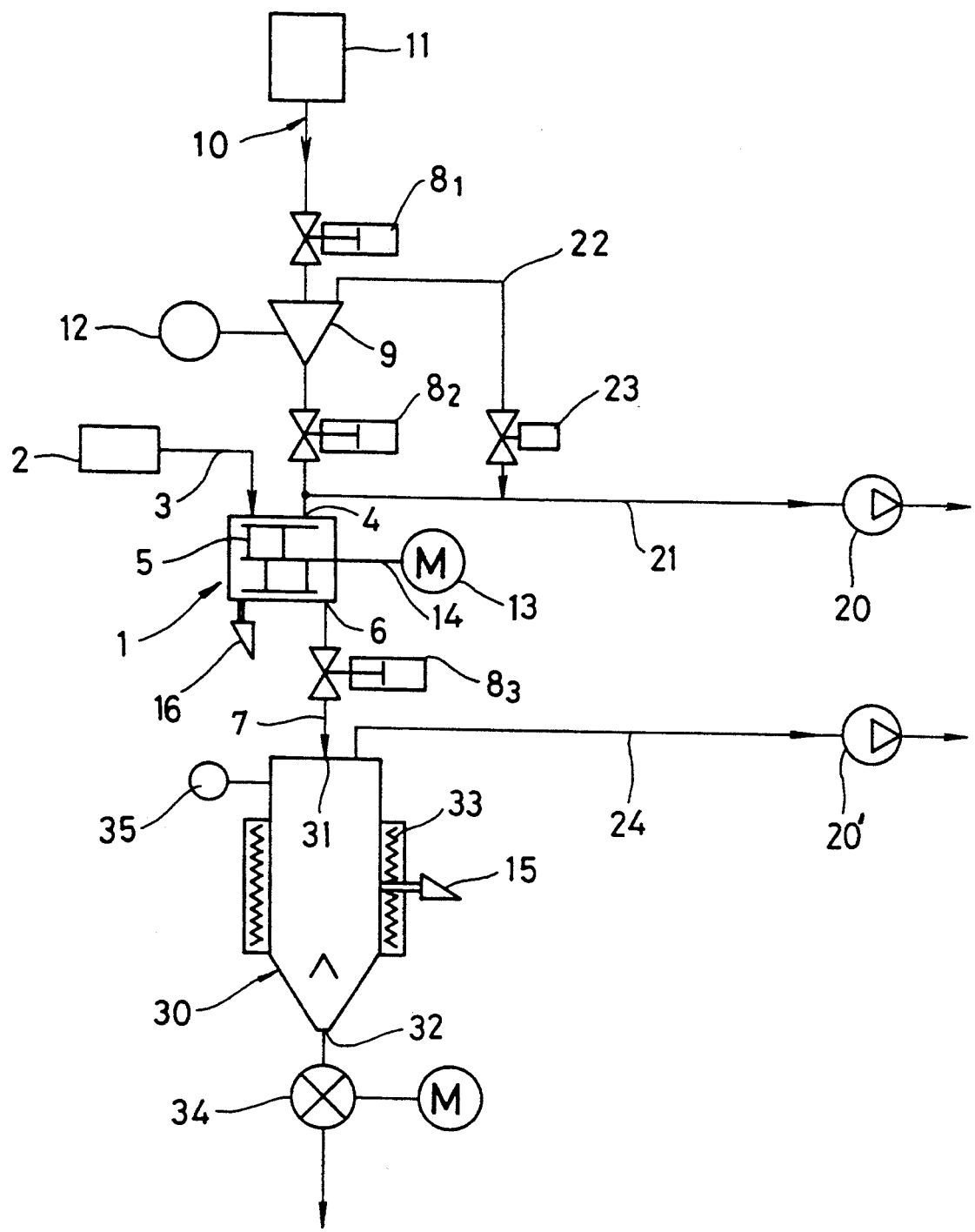
FIG. 1 is a process chart of the embodiment.

A description of the embodiment according to the present invention as shown in FIG. 1 is given hereunder.

1 is a reduced pressure drying tank of closed construction, with a waveguide 3, etc. of an electromagnetic wave generator 2 which produces microwaves, far infrared rays and other electromagnetic waves connected to the top plate and a material inlet 4 provided at another point of that top plate. The powdered or granular materials such as synthetic resin material, etc. supplied into the reduced pressure drying tank 1 through the material inlet 4 are submitted to dielectric heating to the desired temperature by irradiation of electromagnetic waves from the said electromagnetic wave generator 2 while being agitated with the rotation of an agitating means 5 provided inside the said reduced pressure drying tank, under a reduced pressure as described later, and the hot powdered or granular materials are fed into a main drying tank 30 through a communicating tube 7 communicated with a material outlet 6 of the reduced pressure drying tank 1. $8_3$ is a material valve.

A material piping 10 is connected to the material inlet 4 of the reduced pressure drying tank 1 and this material piping 10 is provided to the upstream side with a material valve $8_2$ a preliminary reduced pressure tank 9 and a material valve $8_1$ and a supply source of materials 11 in order.

An exhaust pipe 21 is branched from the said material piping 10 between the material inlet 4 and the material valve $8_2$ and a suction air source 20 such as diaphragm pump, etc. is connected to this exhaust pipe 20 so that the pressure inside the reduced pressure drying tank 1 may be reduced to under the atmospheric pressure (100–200 Torr in the embodiment, but not limited to this value), by operating this suction air source 20. Moreover, a branch exhaust pipe 22 is connected halfway on the exhaust pipe 21 and the other end of this branch exhaust pipe 22 is connected to the said preliminary reduced pressure tank 9, so that the pressure inside this preliminary reduced pressure tank 9 may also be reduced by opening the exhaust valve 23.

Figure 2:
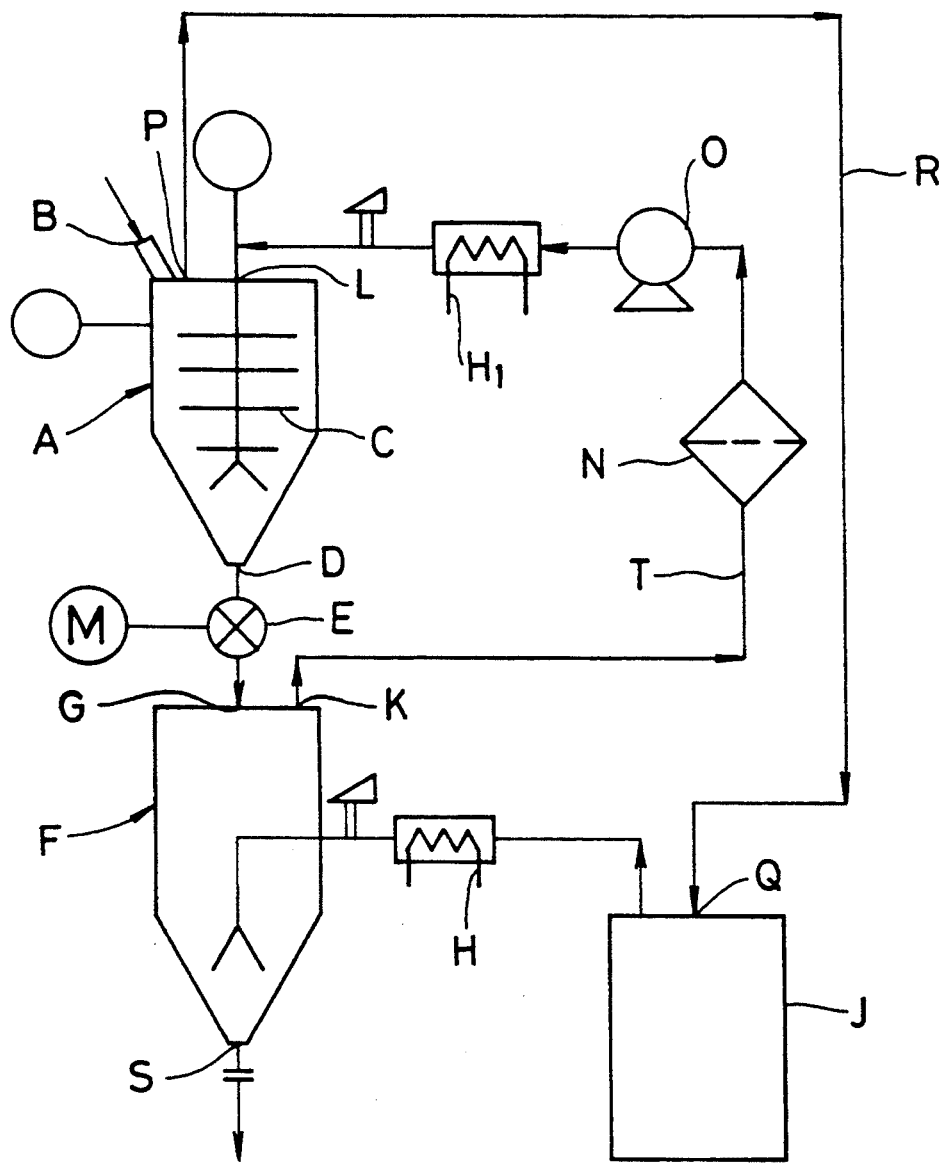
FIG. 2 is a process chart of the conventional example.

The lower end of the said communicating tube 7 is connected for communication with the material inlet 31 of the main drying tank 30. This main drying tank 30 is provided on its circumferential wall with a heater. Moreover, a exhaust pipe 24 is connected to the top plate of the main drying tank 30 and the other end of this exhaust pipe 24 is connected with another suction air source 20′ which is different from said suction air source 20, so that the pressure inside the main tank 30 may also be reduced with the action of suction air source 20′ in order to work at the different pressure from the reduced pressure drying tank 1 and the spare reduced pressure tank 9. According to this construction, the pressure in the reduced pressure drying tank 1 can be made very low because microwaves produce an electromagnetic discharge at the irradiation port under a reduced pressure of 100 Torr or under. Therefore, it is preferable to apply this construction in the case of reducing the pressure in the main drying tank 30 to $1-10^{-3}$ or so, for example, in the case the drying speed is insufficient or the final moisture percentage is insufficient at the pressure exerted on the reduced pressure drying tank 1 and the main drying tank 30 (100–200 Torr, for example) in FIG. 2. The powdered or granular materials dried to the prescribed moisture percentage in the main drying tank 30 are discharged to the subsequent process from a material outlet 32 through an airtight rotary feeder 34. The symbol 12 indicated in the drawing represents a level meter, 13 is a drive source such as motor which turns an agitating means 5 mounted on a rotary shaft 14, and 15 is a temperature sensor.

Now the actions of this embodiment will be described hereunder.

With the material valve $8_2$ closed, the material valve $8_1$ opens to supply the powdered or granular materials from the supply source of materials 11 to inside the preliminary reduced pressure tank 9 up to the upper limit value of the level meter 12 and closes when the tank is filled with the prescribed volume of powdered or granular materials.

Next, the exhaust valve 23 which was closed opens to reduce the pressure inside the preliminary reduced pressure tank 9 to the prescribed pressure (100–200 Torr for example, but not limited to this value).

On the other hand, both the reduced pressure drying tank 1 and the main drying tank 30 are depressurized separate suction air source 20 and 21 in advance to the prescribed pressure (100–200 Torr for example, but not limited to this value). Namely, the granular materials to be dried are heated inside the reduced pressure drying tank 1 through a heating process which heats the granular materials to the prescribed temperature with electromagnetic waves under a reduced pressure lower than the atmospheric pressure of a range not producing glow discharge and inside a main drying tank 30 through a pressure reducing process which performs final drying by producing a vacuum at a higher degree compared with the state of pressure reduction in the heating process in the absence of electromagnetic waves.

In this state, the material valve $8_2$ opens to supply the powdered or granular materials from the preliminary reduced pressure tank 9 to the reduced pressure drying tank and then closes. Under this depressurized state, electromagnetic waves such as microwave are irradiated from the electromagnetic wave generator 2 on the powdered or granular materials inside the reduced pressure drying tank 1 while the materials are being agitated with the operation of the drive source 13. The powdered or granular materials are heated with electromagnetic waves until the materials reach the prescribed temperature while measuring the material temperature with the temperature sensor 16 of the reduced pressure drying tank 1. The water content vaporized from the materials during this heating is discharged from the suction air source 20 through the material inlet 4 and the exhaust pipe 21.

If the materials reach the prescribed temperature, the electromagnetic wave generator 2 stops working and the material valve $8_3$ opens to inject the powdered or granular materials from the reduced pressure tank 1 into the main drying tank 30 and then closes. The above process is performed repeatedly in linkage with the level meter 35 of the main drying tank 30.

Since the inside of the main drying tank 30 is maintained at the prescribed temperature with the heater heater 33 and the temperature sensor 15, the materials injected inside the main drying tank 30 are dried under a reduced pressure while maintaining the temperature obtained as a result of heating in the reduced pressure drying tank 1. And the water content evaporated from the materials inside the main drying tank 30 is discharged through the exhaust pipe 24 with the suction force of the suction air source 20'.

The materials dried to the prescribed moisture percentage are discharged from the rotary feeder 34 to the subsequent process in accordance with the request from the subsequent process.

It is also possible to adopt a construction designed to supply the preliminary reduced pressure tank 9 in powdered or granular materials under the atmospheric pressure without connecting the branch exhaust pipe 22 and the exhaust valve 23 to it and depressurize the reduced pressure drying tank 1. In that case, a closing valve (not illustrated) will be provided at a proper point on the discharge tube 21.

In FIG. 1, a construction without the material valve $8_1$, the preliminary reduced pressure tank 9, the branch exhaust pipe 22 and the exhaust valve 23 can also be adopted. In that case, a level meter (not illustrated) will be provided on the reduced pressure drying tank 1.

The purpose of submitting the powdered or granular materials to dielectric heating under a reduced pressure with electromagnetic waves such as microwave, etc. from an electromagnetic wave generator in the reduced pressure drying tank 1 is to increase the temperature of the powdered or granular materials but this heating process also serves for crystallization in the case of powdered or granular materials of plastic materials such as non crystallized polyethylene terephthalate, etc.

We claim:

1. A method for drying granular materials intended to dry the granular materials to be dried through a heating process which heats the granular materials with electromagnetic waves under a reduced pressure lower than the atmospheric pressure and a pressure reducing process which performs final drying by producing a vacuum of a higher degree compared with the state of pressure reduction in said heating process in the absence of electromagnetic waves.

2. An apparatus for drying granular materials comprising:
   a reduced pressure drying tank (1) having an electromagnetic wave generator (2) which submits the granular materials fed through the material inlet (4),
   a main drying tank (30) communicated with the material outlet (6) of said reduced pressure drying tank (1) through a communicating tube (7), and a heater (33) also being provided, and
   suction air sources (20), (20') connected respectively to said reduced pressure drying tank (1) and the main drying tank (30).

3. An apparatus for drying granular materials as defined in claim 2, wherein a spare reduced pressure tank (9) is provided upstream of the reduced pressure drying tank (1), said spare reduced pressure tank (9) also being depressurizable with a suction air source.

4. An apparatus for drying granular materials as defined in claim 3, wherein the suction air source for the spare reduced pressure tank (9) is common with the suction air source (20) for the reduced pressure drying tank (1).

5. An apparatus for drying granular materials as defined in any of claims 2 to 4, wherein an agitating means (5) is provided inside the reduced pressure drying tank (1).

* * * * *